United States Patent [19]

Keene et al.

[11] Patent Number: 4,877,502
[45] Date of Patent: Oct. 31, 1989

[54] POLY(EPOXIDE) COATINGS CONTAINING A MANNICH BASE OF A HYDROXYSTYRENE CONTAINING POLYMER

[75] Inventors: Donna L. Keene, Carrollton, Va.; Darrell D. Hicks, Jeffersontown, Ky.

[73] Assignee: Hoechst Celanese Corporation, North Sommerville, N.J.

[21] Appl. No.: 219,697

[22] Filed: Jul. 18, 1988

[51] Int. Cl.$^4$ .................. C08L 29/00; C08L 63/00
[52] U.S. Cl. .................. 204/181.7; 523/409; 523/456; 525/109; 525/110; 525/118; 524/901
[58] Field of Search ............ 528/99; 525/118, 110, 525/109; 523/409, 416, 456; 204/181.7

[56] References Cited

U.S. PATENT DOCUMENTS

| | | | |
|---|---|---|---|
| 4,433,015 | 2/1984 | Lindert | 524/413 |
| 4,457,790 | 7/1984 | Lindert | 524/413 |
| 4,517,028 | 5/1985 | Lindert | 524/543 |

Primary Examiner—C. Warren Ivy
Attorney, Agent, or Firm—Richard S. Roberts; Donald R. Cassady

[57] ABSTRACT

A coating composition which is a uniformly dispersed admixture of
A. a fluid carrier; and
B. a homopolymer or copolymer containing monomer units of the formula

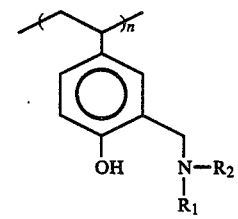

wherein $R_1$ and $R_2$ are preferably hydroxyalkyl and the polymer has a preferred average molecular weight in the range of from about 5,000 to about 30,000; and
C. a poly(epoxide).

21 Claims, No Drawings

POLY(EPOXIDE) COATINGS CONTAINING A MANNICH BASE OF A HYDROXYSTYRENE CONTAINING POLYMER

BACKGROUND OF THE INVENTION

The invention pertains to a cured epoxy resin composition suitable for protecting the surfaces of sheet materials such as metals. More particularly, the invention is directed to applied layers of a material containing apolyepoxide and a Mannich base of a hydroxystyrene homopolymer or copolymer.

U.S. Pat. No. 4,399,257 teaches poly-p-vinyl phenol as a hardening agent for epoxy resins in the presence of a Sn salt of an organic acid. U.S. Pat. No. 4,442,246 teaches a self-emulsifiable ester of epoxy and an acid containing addition polymer.

The foregoing patents indicate the desire for applying protective coatings to metal and other surfaces for the purpose of enhancing resistance to corrosion. Many coating compositions directed to this end are well documented in the published literature and many are commercially available as well. Typical prior art protective coatings include pigments suspended in a vehicle. The vehicle consists primarily of a resinous binder dissolved in solvents or dispersed in water together with small quantities of driers, plasticizers, and stabilizers as required by the intended end use. As the film dries the vehicle converts into a solid film either by evaporation of solvents or water, oxidation or polymerization through the application of heat, addition of a catalyst or a combination of reactive components. Protective coatings include oleoresinous paints or drying oils, oil based paints, and alkyd phenolic, epoxy, chlorinated rubber silicone, vinyl, acrylic, nitrocellulose, polyester and polyurethane paints and varnishes. The selection of coating depends on its intended application and the degree of protection required for the end use conditions.

In known prior art epoxy coatings, the resins consist of a polymerization product of epichlorohydrin and bisphenol A. This resin then undergoes a cross-linking reaction on the metal surface through the action of a curing agent and optionally through the application of heat to accelerate the cure. The catalyst employed is chosen depending on the coating properties desired.

Polyamine curing agents produce hard, high gloss, chemically resistant coatings for interior or exterior atmospheric exposure. The disadvantages of polyamine curing agents are the necessity for accurate measurements of small quantities and the toxic nature of the curing agent. These polyamines contain a multiplicity of $-NH_2$ and $-RNH$ groups and are known as curing agents. Amine "catalysts" are generally tertiary amines which promote epoxy/epoxy reactions.

Amine adduct curing agents are polyamines partially reacted with less than an equivalent amount of the epoxy resin. These curing agents are relatively non-toxic.

Polyamide catalysts are polyamines reacted with unsaturated fatty acids, usually dimerized linoleic acid, in ratios designed to yield amine terminated polyamides.

The polyamine or polyamide curing agent is added to the epoxy resin just prior to application. This causes a crosslinking of the molecules and curing of the coating after it has been applied to the surface.

Cured epoxy coatings show excellent resistance to a wide range of chemicals, solvents, oils, acids, and alkalies. In addition, they exhibit excellent adhesion to almost all types of surfaces, including metal, wood, and concrete.

However, basic amine curing agents may require special care with respect to health hazards in addition to normal safety precautions.

This invention provides a coating containing Mannich bases of poly(p-hydroxystyrene) and copolymers thereof which are used to cure epoxy resins. The system may be water-borne or solvent-borne.

A prospective advantage to using the Mannich base as a curing agent is that the tertiary amine functionality may act as a built-in catalyst for the phenolic hydroxyl/epoxy curing reaction thus reducing or eliminating the need for the addition of an external catalyst, although external catalysts may be used in the composition.

SUMMARY OF THE INVENTION

The invention provides a coating composition which comprises a uniformly dispersed admixture of A. a fluid carrier; and B. a homopolymer or copolymer containing monomer units of the formula

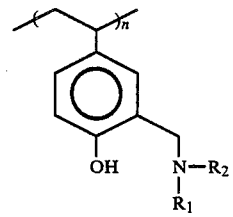

wherein $R_1$ and $R_2$ are independently $C_1$ to $C_{12}$ alkyl, or hydroxyalkyl, or aryl, wherein the comonomer is a substituted or unsubstituted component selected from the group consisting of styrene, acrylates, methacrylates and maleimides; said homopolymer or copolymer having an average molecular weight in the range of from about 360 to about 200,000; and C. a poly(epoxide).

DETAILED DESCRIPTION OF THE PREFERRED EMBODIMENT

In the preferred embodiment, one begins preparing polymers which are Mannich bases of poly(p-hydroxystyrene). These preferably have the formula

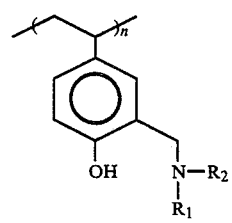

wherein $R_1$ and $R_2$ are independently $C_1$ to $C_{12}$ alkyl, or hydroxyalkyl, or aryl. Mannich bases of poly(p-hydroxystyrene) are per se well known in the art as described in U.S. Pat. Nos. 4,376,000; 4,433,015; 4,457,790 and 4,517,028 which are incorporated herein by reference. These compounds are based on derivatives of polyalkenylphenol polymers. Examples of polyalkenylphenols or substituted alkenylphenols useful in the present invention include isopropenylphenol, isobutenylphenol, dimethylvinylphenol and the like. Suitable derivatives having the above general formula may be made by the Mannich Reaction. For example, a poly-4-vinylphenol polymer can be reacted with formaldehyde and a secondary amine to yield a product which can be neutralized with an organic or inorganic acid to yield a water soluble or dispersible solution or emulsion of the compound of this invention.

The molecular weight of the poly-alkenylphenol used in the preparation of derivatives claimed in the present invention can range from low molecular weight oligomers of 360 to high molecular weight of 200,000 or greater.

The resulting derivatives of the formula set forth hereinabove will preferably have a molecular weight of 5,000 up to about 100,000, with molecular weights within the range of about 5,000 to about 30,000 being preferred.

The Mannich bases of this invention are soluble in organic solvents and can be used as a treatment solution when dissolved in an organic solvent as, for example, ethanol. Advantageously, however, the treatment compound can also be used in an aqueous medium. To provide water solubility or water dispersibility of the compound, an organic or inorganic acid can be used for neutralization. Useful acids for this purpose are acetic acid, citric acid, oxalic acid, ascorbic acid, phenylphosphonic acid, chloromethylphosphonic acid; mono, di and trichloroacetic acid, formic acid, trifluoroacetic acid, nitric acid, phosphoric acid, hydrofluoric acid, sulfuric acid, boric acid, hydrochloric acid, hexafluorosilicic acid, hexafluorotitanic acid, hexafluorozirconic acid, and the like; alone or in combination with each other. Preferably the acid is volatile under conditions employed to cure the films. The addition of water to the neutralized, over neutralized or partially neutralized treatment compounds mentioned above results in a water solution, dispersion or emulsion of the polymer.

In general about 15% to about 50% of the amine nitrogens are salted with the acid. Suitable secondary amines non-exclusively include dialkyl amines, dialkanol amines, alkylalkanol amines and diallyl amines. Diethanol amine is most preferred. The density of Mannich base units on the polymer may be varied by adjusting ratio of formaldehyde, amine, and polymer aromatic rings. The polymeric Mannich base is desirably recovered at 70–80% concentration in a water miscible glycol ether.

The polymer set forth above is preferably a homopolymer, but it may also be a copolymer wherein the co-monomers are units of styrene, acrylates, methacrylates and maleimides. Both the phenolic and co-monomer units may optionally be substituted with a variety of pendant groups in order to adjust the properties of the compound as desired by the user.

The poly(epoxides) useful for this invention are also well known in the art.

There is no specific limit set as to the type of resin used for the epoxy resin composition of this invention, so long as it is a compound containing 2 or more epoxy groups in its molecule. In general, however, a common epoxy resin has a molecular weight ranging from 370 to about 6,000, preferably about 4,000 to about 5,000. The preferred epoxy resins of such type include bisphenol type epoxy resin, alicyclic epoxy resin, novolak type epoxy resin, nitrogen-bearing epoxy resin, and a halogenated epoxy resin, such as brominated epoxy resin.

Among the common epoxy resins available in commerce are diglycidyl ethers made by reaction of epichlorohydrin with Bisphenol A. Typically they have a molecular weight in the range of about 370 to 6,000.

In the most preferred embodiment, the partially neutralized Mannich base and poly(epoxide) solutions are then blended together in approximately a 0.5–2:1, preferably 1:1 equiv. ratio polyepoxide:phenolic hydroxyl. Water is then added under fairly high speed agitation to form a dispersion.

In general at least about 20% of the active phenolic hydroxyl groups of the Mannich base should be reacted with epoxy groups in order to effect a cure. In the preferred embodiment from about 20% to about 100% should be so reacted. The dispersion may be used by coating it on a surface to be protected from corrosion, such as a metal surface.

Well cured thermosetting films on metal are produced on baking at 150°–200° C. for 10–30 min. in presence of an optional catalyst.

Materials which catalyze curing include amines, particularly tertiary amines, titanic acid esters, siloxane compounds, acetylacetone metallic salts and dibutyl tin dilaurate. One popular catalyst is tris(dimethylaminomethyl)phenol, available commercially as DMP-30 from Rohm and Haas. The catalyst employed should promote the phenolic hydroxyl/epoxy crosslinking reaction and the teriary amine in the Mannich base is usually sufficient. The catalyst is preferably present in an amount of from about 0.1 to about 5.0 percent by weight of the composition.

The composition of this invention is formed by dispersing the components in a fluid carrier, such as water or water/cosolvent mixture. Cationic electrocoated films may be produced from these dispersions. In addition to water-borne coatings, solvent-borne coatings are also contemplated for coating applications other than electrocoating.

Other solvents which may be used include organic solvents of limited water miscibility, such as xylene, toluene, and butanol, and they may be used alone or together with water miscible solvents, such as 2-ethoxy ethanol or methyl ethyl ketone.

The aqueous coating compositions of this invention are primarily useful for primer or top coating aluminum, tin plated steel, pretreated metals, or untreated steel. The aqueous compositions also can be used for coating other substrates.

The following non-limiting examples serve to illustrate the invention.

EXAMPLE 1

A solution of the diethanol amine Mannich Base of poly(p-hydroxy styrene) (15.75 gm which is 65% solids in propylene glycol monopropyl ether, 0.51 g acetic acid and 10 ml of deionized water), Epi-Rez 520-C water dispersed epoxy (Interez, 55% Solids, 10.0 gm, bisphenol-A based epoxy resin having an epoxy equivalent weight of approximately 500) and 15.7 gm deionized water is mixed with an overhead stirrer. The mixture is a homogeneous dispersion and is out 30% solids. Using 1 ml draw down bar, films are cast on steel panels (Bonderite and cold rolled). The films are baked at 175° C. for 30 minutes.

EXAMPLE 2

A solution of the diethanolamine Mannich base of poly(p-hydroxystyrene (15.75 gm which is 65% solids in propylene glycol monopropyl ether, 0.51 g HOAc and 10 ml of deionized water) [2.6 gm of afore described solution], Epi-Rez 522-C water dispersed epoxy, 60% solids, 10.0 gm, (Interez) and 11.1 g of deionized water are mixed with an overhead stirrer for about 15 minutes to give a homogeneous mixture. Films are drawn using a 1 ml drawn down bar. A few small solid flecks are observed in film. The film is hazy after drying at room temperature. The films are cured at 175° C. for 35 minutes.

What is claimed is:

1. A coating composition which comprises a uniformly dispersed admixture of
  A. a fluid carrier; and
  B. a homopolymer or copolymer containing monomer units of the formula

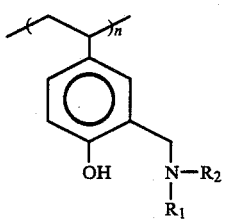

wherein $R_1$ and $R_2$ are independently $C_1$ to $C_{12}$ alkyl, or hydroxyalkyl, or aryl, wherein the comonomer is a substituted or unsubstituted component selected from the group consisting of styrene, acrylates, methacrylates and maleimides; said homopolymer or copolymer having a value of n which corresponds to an average molecular weight in the range of from about 360 to about 200,000; and
  C. a poly(epoxide).

2. The composition of claim 1 wherein component (B) is a homopolymer having an average molecular weight in the range from about 5,000 to about 100,000.

3. The composition of claim 1 wherein component (B) is a homopolymer having an average molecular weight in the range from about 5,000 to about 30,000.

4. The composition of claim 1 wherein $R_1$ and $R_2$ are $C_2$ to $C_{12}$ alkyl or hydroxyalkyl.

5. The composition of claim 1 wherein $R_1$ and $R_2$ are independently selected from the group consisting of —CH$_2$CH$_2$OH and —CH$_2$CH$_2$CH$_2$OH.

6. The composition of claim 1 wherein said fluid carrier comprises water or water in admixture with a water miscible glycol monoether.

7. The composition of claim 1 wherein said fluid carrier comprises an alcohol.

8. The composition of claim 1 wherein said fluid carrier comprises methanol or ethanol.

9. The composition of claim 1 wherein said poly(epoxide) has a molecular weight in the range of from about 370 to about 6,000.

10. The composition of claim 9 wherein said poly(epoxide) has a molecular weight in the range of from about 4,000 to about 5,000.

11. The composition of claim 1 further comprising a catalyst capable of accelerating the reaction between components (B) and (C).

12. The composition of claim 11 wherein said catalyst is an amine.

13. The composition of claim 11 wherein said catalyst is an amide.

14. The composition of claim 1 further comprising a catalyst selected from the group consisting of a tertiary amines, titanic acid esters, siloxane compounds, acetylacetone metallic salts and dibutyl tin dilaurate.

15. The composition of claim 14 wherein said catalyst is present in an amount of from about 0.1% to about 5.0 % based on the weight of the composition.

16. The composition of claim 15 wherein components (B) and (C) are present in about a 0.5-2:1 equivalent ratio of epoxy group:phenolic hydroxyl groups.

17. The composition of claim 1 wherein said fluid carrier comprises water or an alcohol; component (B) is a homopolymer wherein $R_1$ and $R_2$ are hydroxyalkyl and the homopolymer has an average molecular weight in the range of from about 5,000 to about 30,000; and said poly(epoxide) has a molecular weight in the range of from about 4,000 to about 5,000; and components (B) and (C) are present in about a 0.5-2:1 equivalent ratio of epoxy group:phenolic hydroxyl groups.

18. The composition of claim 17 further comprising a catalyst.

19. A method of protecting a surface which comprises applying the composition of claim 1 onto said surface and curing composition by heating.

20. The method of claim 19 wherein said curing is conducted by baking the composition at from about 150° C. to about 200° C. for from about 10 to about 30 minutes in the presence of a catalyst.

21. A method of protecting a metallic surface which comprises cationically electrodepositing the composition of claim 1 onto said surface and curing wherein the fluid carrier is water or a water/co-solvent mixture.

* * * * *